May 15, 1923.
G. G. OBERFELL
1,455,263
METHOD AND APPARATUS FOR TESTING GASEOUS MIXTURES
Filed June 11, 1920
2 Sheets-Sheet 2
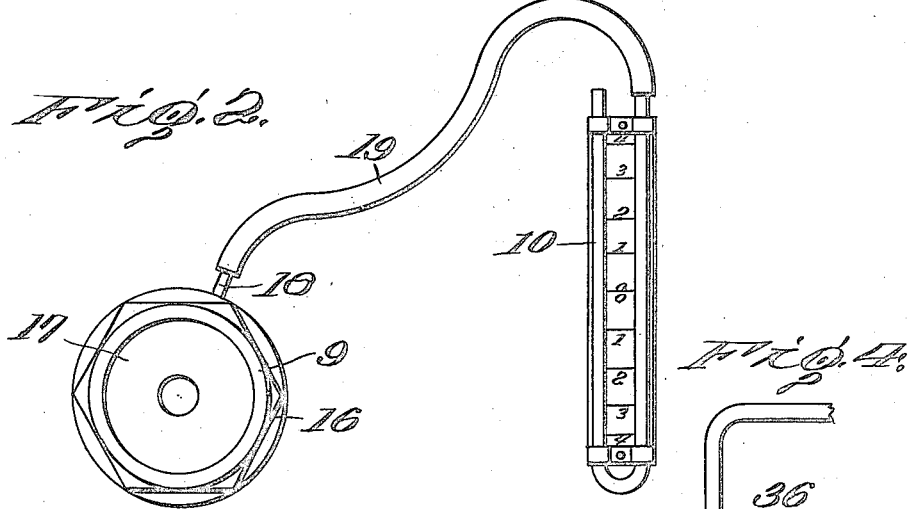
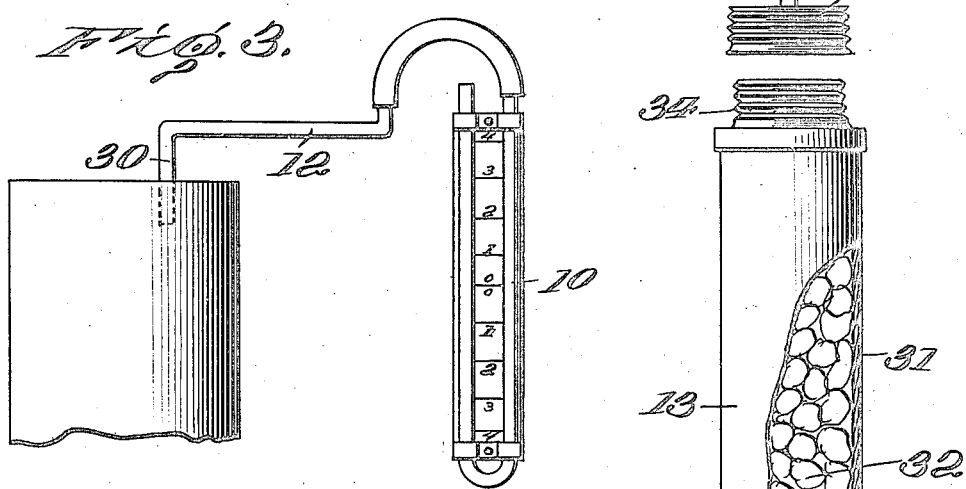
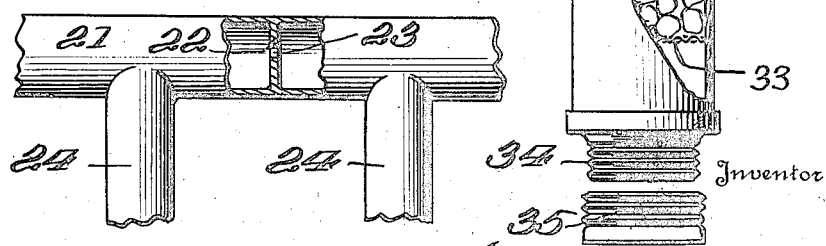
Inventor
George G. Oberfell
George L. Prewott
By
Attorney Patented May 15, 1923.

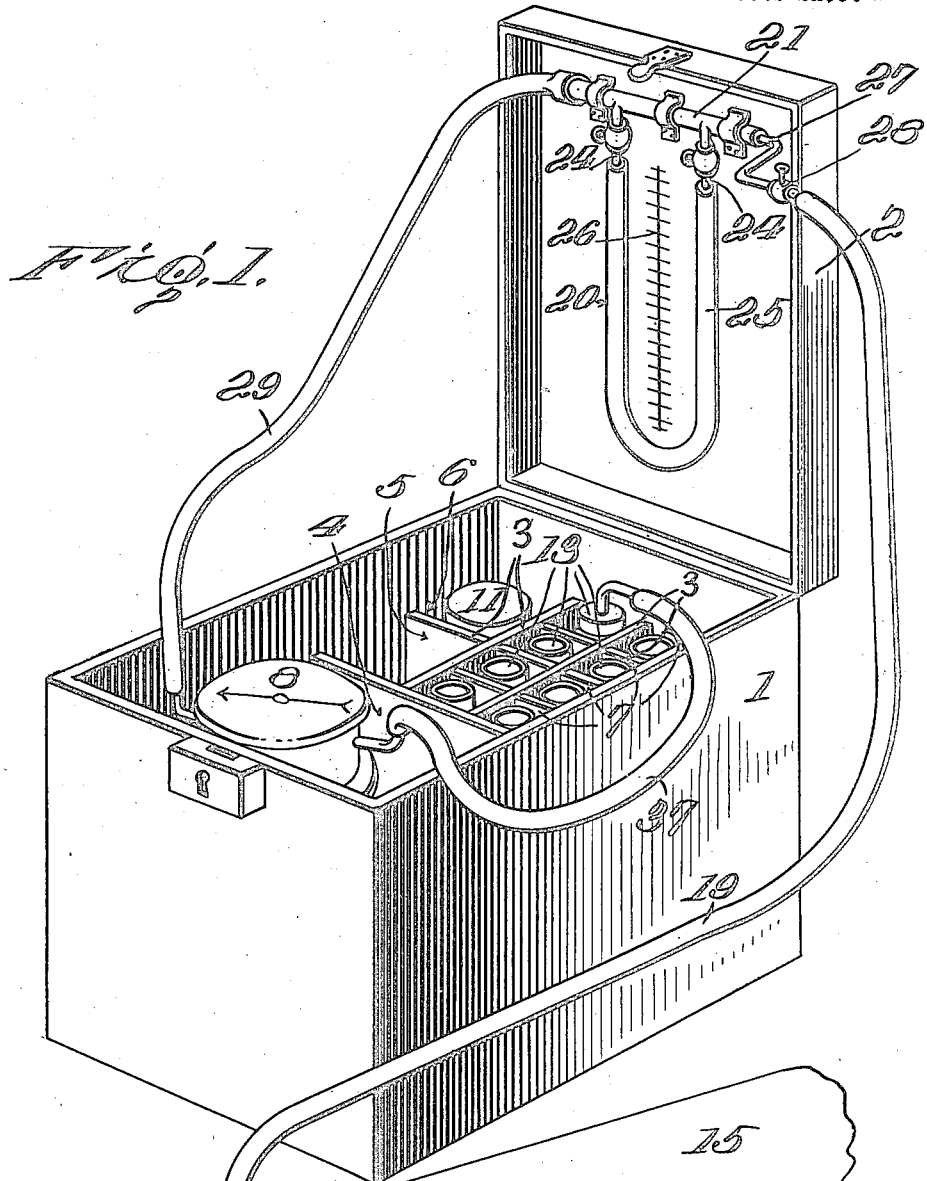

1,455,263

UNITED STATES PATENT OFFICE.

GEORGE G. OBERFELL, OF TULSA, OKLAHOMA.

METHOD AND APPARATUS FOR TESTING GASEOUS MIXTURES.

Application filed June 11, 1920. Serial No. 388,370.

*To all whom it may concern:*

Be it known that I, GEORGE G. OBERFELL, a citizen of the United States, residing at Tulsa, in the county of Tulsa and State of Oklahoma, have invented certain new and useful Improvements in Methods and Apparatus for Testing Gaseous Mixtures; and I do hereby declare the following to be a full, clear, and exact description of the invention, such as will enable others skilled in the art to which it appertains to make and use the same.

In many industrial operations it frequently happens that valuable vapors are lost by allowing them to escape with various amounts of gases which contain them. This is especially true of the natural gas gasoline industry, where gasoline vapors carried by natural gas are recovered by processes which depend upon the principles of compression, refrigeration and absorption in liquid absorbing media. (See Bureau of Mines Bulletins Nos. 88, 120, 151 and 176.)

In order to properly control and to ascertain the efficiency of operation of plants used for recovery of vapors from gaseous mixtures, it is desirable to make tests of the gaseous mixtures before and after plant treatment. It is also necessary to make certain tests of gaseous mixtures in order to determine whether a proposition for extraction of vapors would be a profitable one.

This invention pertains to improvements in the methods and apparatus for testing gaseous mixtures for volume, specific gravity and amount of organic vapors, said vapors being liquefiable at ordinary temperatures and pressures. Although the methods and apparatus have been developed more especially for testing natural gas, they can be used for similar testing purposes for other gaseous mixtures.

Descriptions of the various methods and apparatus meeting with general use in testing gases and gaseous mixtures are contained in the following publications:

Bureau of Mines Bulletins Nos. 42, 88, 120, 151 and 176 and Technical Paper No. 87; Handbook of Natural Gas by H. P. Westcott and Handbook of Casing Head Gas by H. P. Westcott.

The method and apparatus herein described for testing gaseous mixtures possess new and useful improvements in that the apparatus is more easily and more conveniently constructed and operated, is more readily portable, requires less material, gives accurate and rapid results and makes possible a better and more economical valuation of the gaseous mixture. Moreover, the method of determining the condensable vapor content is applicable over a wider range of temperatures and pressures and can be applied successfully to a greater variety of gaseous mixtures.

I have discovered that some solid substances such as highly activated charcoal, silicia gel, iron gel, etc., are adapted for use as absorbent media for determining the amount of condensable vapors in gaseous mixtures and one of the objects of this invention is to provide a testing method and apparatus whereby such media may be so employed.

Charcoal made from cocoa nut shells, peach pits, plum pits, hard coal, wood, etc., and which is made from such substances by first heating at about 1000° C. for about twelve hours with subsequent cooling, and reheating with air steam, carbon dioxide or other suitable oxidizing agent is particularly adapted for this purpose as by these means there is produced a charcoal of exceptional absorbing qualities. The property of absorbing vapors at relatively low temperatures, and again giving off these vapors at relatively high temperatures is dependent upon the history of the charcoal, as concerns its source and treatment during process of manufacture. Charcoal made in U. S. prior to the year of 1917 was practically unsuited for the purpose of determining the condensable vapor content of gaseous mixtures.

There follows descriptions of the methods and apparatus such as will enable others skilled in the art to which they appertain to make and use the same. For simplicity of explanation, the method is described as being used on natural gas with charcoal as the absorbing medium. However, it is obvious that the methods and apparatus herein described may be used in testing other gaseous mixtures and that the method of determining the condensable vapor content may be employed with other solid absorbing media.

The methods and apparatus are described in detail in connection with the accompanying drawings, in which;

Fig. 1 is a perspective view of the novel apparatus showing the cover of the casing opened and the orifice meter connected to the flow meter; the flow meter connected to the dry test meter; and the dry test meter connected to one of the absorber units.

Fig. 2 is an end view of the orifice meter showing the same connected with a siphon gauge and used for determining small flows of gas from a casing head or pipe line.

Fig. 3 is a view showing a pitot tube and siphon gauge placed in a source of gas flow for determining larger flows of gas from a casing head.

Fig. 4 is a side view partly in section of one of the absorber units, a similar view of one of the caps used in sealing the unit, and a nipple cap used in connecting the unit to the dry test meter.

Fig. 5 is a view partly in section of a portion of the flow meter which is carried by the cover of the casing.

Referring to the drawings, 1 represents a portable casing having a cover 2. The body of the casing is divided interiorly, by a number of vertical partitions 3, into a large compartment 4, two medium size compartments 5 and 6 and eight small compartments 7.

Located in the compartment 4 is an ordinary dry test meter or any other type of positive meter 8.

The compartment 5 is designed to contain an orifice meter 9, which is shown removed from the casing in Figs. 1 and 2.

The compartment 6 is to house a siphon gauge 10, a spring gauge 11, a pitot tube 12, and other equipment, such as extra screw caps and connections, thermometer, stop watch, rubber tubing, etc.

Located in the compartments 7 are the absorber units 13.

The orifice meter 9 consists of an open ended tube threaded exteriorly at one end, as shown at 14, for the purpose of attaching the meter to a casing head or gas pipe 15, as shown in Fig. 1. The opposite end of the tube is provided with a removable open ended cap 16, which secures an orifice plate 17 to said tube. A number of the plates 17 are carried in the casing, having various sized apertures used in connection with gas flows of various volumes. A nipple 18 is also provided on one side of the tube and is adapted to be connected by rubber tubing 19 to a flow meter 20, as shown in Fig. 1, or to the siphon gauge 10, as illustrated in Fig. 2.

The flow meter is carried by the cover 2 and it consists of a horizontal pipe 21 having a partition 22, as shown in Fig. 5, provided with an aperture or orifice 23. The pipe has two downwardly extending legs 24, one of which is located on either side of the orifice partition, and a manometer or U-tube gauge 25 has its ends connected to said legs, as shown in Fig. 1. Indicating liquid in the manometer co-operates with a suitable scale 26 mounted on or attached to the inner surface of the cover 2. One end of the pipe 21 is provided with a connection 27 having a needle valve 28, and the tubing 19 is adapted to be secured to this connection in making certain tests. The other end of the pipe 21 may be connected to the dry test meter 8 by a flexible hose 29.

The pitot tube 12 is of ordinary construction and as is usual in use, its bent end 30 has its axis extending parallel to the gas flow or stream. As best shown in Fig. 4, each absorber unit consists of an open ended cylinder 31 enclosing a body of suitable solid absorbent 32 which rests on a reticulated or perforated support 33. The cylinder ends are in the form of threaded nipples 34 to receive sealing caps 35, one of which is shown in Fig. 4. When the sealing caps are removed, a nipple cap 36 is designed to be placed on the upper end of the cylinder and connected to the dry test meter by a rubber pipe 37, as shown in Fig. 1.

One of the features of this apparatus is the reduction in weight of equipment by making, wherever practical, all metal parts of the apparatus of aluminum.

To determine the gas flow, the orifice meter and siphon gauge or pitot tube method for open flow is employed, according to methods well known by those skilled in the art.

The flow meter, which is used in determining the specific gravity of the gas, may be of the orifice type or the resistance tube type.

To determine the specific gravity of the gas, the flow meter is connected to the gas supply as for example, as shown in Fig. 1, with the gas supply flowing through the orifice meter 9, the needle valve 28 closed and the absorber units disconnected from the dry test meter 8. A plate 17 with proper size orifice is placed in the orifice meter so that the pressure at valve 28 will be sufficient for use in operating apparatus as hereinafter described.

The needle valve is then slowly opened until the desired differential height is shown on the manometer 25 of the flow meter 20. This differential pressure is maintained at a constant value by means of the needle valve and the time taken, by means of a stop watch for passage of a definite volume of gas through the dry test meter. The orifice meter 9 is then disconnected and the time is observed in like units for the passage of an equal volume of air through the dry test meter under the same differential height and with other conditions of experiment constant. The specific gravity of the gas is then calculated from the formula.

$$\text{Specific gravity of gas} \frac{(\text{time for gas})\,2}{(\text{time for air})\,2}$$

To determine the gasoline content the apparatus is connected to the gas supply as for example in the manner shown in Fig. 1, with the gas flowing through the orifice meter and needle valve 28 closed. A measured quantity of gas is passed through one of the absorbers 13 filled with activated charcoal in granular form, the rate of flow through the apparatus being controlled by the needle valve. The absorber containing charcoal enriched with gasoline vapors is subsequently subjected to a distillation test to determine the amount of gasoline absorbed by the charcoal.

It will be noted that a number of absorber units are used in order to obtain samples or charges of condensable vapor from various sources or from different wells. For instance, the carrying case may be transported by hand from one well or plant to another, and one absorber unit or more if desired will be used in testing one source or well and the other units will be used in testing the gases from other sources or wells.

In practical use, a measured quantity of gas is passed through the charcoal in a unit at about atmospheric pressure. When the measured quantity of gas has been passed through the unit, the gas flow is stopped, the unit disconnected, and a slip of paper, containing data for identifying the sample, is replaced in the end of the unit. The sealing caps 35 are then placed on the ends of the unit and the absorber containing the charcoal enriched with gasoline vapors, is sent to the laboratory to determine the gasoline content of the gas.

The use of a flow meter and a dry test meter offers the double advantage of determining the specific gravity of the gas and a means of checking the volume of gas used in the test for the gasoline content. The specific gravity of the gas will be correct even though the dry test meter is in error, providing the error is a constant value since equal volumes of air and gas are passed through the meter in determining the specific gravity. By calibrating the flow meter, with a meter prover or some other suitable standard, the flow meter thus calibrated also may be used in determining the volumes of gas passed through the charcoal. The data obtained by recording the differential height, on the manometer of the flow meter, time for passage of gas, and specific gravity of the gas, are used in calculating the amount of gas passed through the charcoal. The amount of gas that may be passed through the charcoal up to the time that it fails to completely remove the gasoline vapors from the gas, depends upon the gasoline content of the gas, the vapor pressures of the constituents absorbed, the quality, quantity and mesh of charcoal and the temperature, pressure and rate of absorption.

Several methods may be employed for removing the gasoline from the enriched charcoal, such as direct heat, superheated steam, etc. The most satisfactory methods which I have used consist in adding a high boiling substance to the charcoal in a suitable vessel and distilling off the gasoline, or by distilling the gasoline off by superheated steam of about 400° F to 750° F.

There are several changes and modifications which may be employed in the method and apparatus used in distilling the gasoline from the charcoal and, therefore, I do not confine myself to any particular type of apparatus.

After adding a high boiling substance, such as glycerine, to the enriched charcoal in the distilling flask or other suitable vessel, heat is applied, which causes the vapors absorbed by the charcoal to be evolved. The removal of vapors is also facilitated by the glycerine entering the pores of the charcoal. The evolved vapors are caused to pass through a condenser cooled by water or an ice water mixture or other suitable cooling agent, and a condensate thereby obtained. The condensate is led into a graduated receiving cylinder.

The volume of gaseous mixture passed through the charcoal and the volume of condensate obtained by distilling the vapors from the enriched charcoal are used in determining the condensable vapor content of the gas.

I have also discovered that the charcoal from which the gasoline has been removed may be regenerated so that it may be used over again by washing the charcoal with a suitable liquid and then drying the charcoal. If superheated steam distillation is employed to distill the gasoline from the enriched charcoal, the charcoal may be used over again without further treatment. If glycerine is employed to distill the gasoline from the enriched charcoal, water may be used to wash the glycerine from the charcoal and the water removed by drying the charcoal by direct heat. If a mineral oil is employed to distill the gasoline from the enriched charcoal, petroleum ether may be used to wash the mineral oil from the charcoal and the petroleum ether removed from the charcoal by direct heat, or superheated steam.

What I claim and desire to secure by Letters Patent is:—

1. An apparatus for testing a gaseous mixture to determine the flow, specific gravity and condensable vapor content, which comprises a compact and portable case containing an orifice meter and equipment for regulating the flow, a flow meter and positive meter for use in determining the volume and specific gravity, and tubes connectable with one of said meters and filled with activated charcoal for use in determining the condensable vapor content of the gaseous mixture.

2. An apparatus for testing a gaseous mixture to determine the specific gravity and condensable vapor content, which comprises a compact and portable case containing a flow meter and positive meter for determining the specific gravity, a flow meter and positive meter and tubes filled with activated charcoal for determining the condensable vapor content of the gaseous mixture, and means for connecting the last mentioned meters and tubes.

3. An apparatus for testing a gaseous mixture to determine the condensable vapor content which comprises a compact and portable case containing a positive meter and a flow meter, a pipe connecting the outlet of the flow meter to the inlet of the positive meter, a tube filled with a solid absorbing medium, and means for connecting the outlet of the positive meter to the tubes in operative relation.

4. An apparatus for testing gases including a flow meter adapted to have its inlet connected to a gas supply, a positive meter communicating with the outlet of said flow meter, and a tube of solid absorbent communicating with the positive meter.

In testimony whereof I affix my signature.

GEORGE G. OBERFELL.